United States Patent [19]
Wickander

[11] Patent Number: 5,479,721
[45] Date of Patent: Jan. 2, 1996

[54] METHOD AND APPARATUS FOR MEASURING THE LENGTH (MIU) OF THE INTERNAL TAPER OF AN INTERNALLY UPSET DRILL PIPE TUBE

[75] Inventor: Nels Wickander, Spring, Tex.

[73] Assignee: Prideco, Inc., Houston, Tex.

[21] Appl. No.: 220,281

[22] Filed: Mar. 30, 1994

[51] Int. Cl.$^6$ .............................. G01B 3/56; G01B 21/22
[52] U.S. Cl. .............................. 33/531; 33/701; 33/544.2; 33/542.1
[58] Field of Search .............................. 33/783, 807, 808, 33/810–812, 529, 531, 542, 544, 544.2, 544.3, 544.5, 544.4, 542.1, 558.01, 558.04, 558.2, 558.5, 701

[56] References Cited

U.S. PATENT DOCUMENTS

| | | | |
|---|---|---|---|
| 1,112,699 | 10/1914 | Houston | 33/544.2 |
| 1,880,261 | 10/1932 | Larsen | 33/544.5 |
| 2,540,282 | 2/1951 | Oliver | 33/531 |
| 3,250,012 | 5/1966 | Bell | 33/544.5 |
| 4,307,514 | 12/1981 | Angle et al. | 33/544.2 |

FOREIGN PATENT DOCUMENTS

| | | | |
|---|---|---|---|
| 876159 | 5/1953 | Germany | 33/542 |
| 268711 | 2/1969 | Germany | 33/531 |
| 113902 | 9/1980 | Japan | 33/544 |
| 249009 | 12/1985 | Japan | 33/529 |
| 297802 | 10/1992 | Japan | 33/544.4 |
| 641269 | 1/1979 | U.S.S.R. | 33/531 |

*Primary Examiner*—Thomas B. Will
*Attorney, Agent, or Firm*—Vaden, Eickenroht, Thompson & Feather

[57] ABSTRACT

A method of measuring the internal taper (Miu) of an internally upset tube is disclosed along with the apparatus for practicing the method. The apparatus includes a first link mechanism that is operated to move a plurality of locating arms outwardly to a position near the inner wall of the tube. The locating arms are moved into the taper until the forward end of each arm is deflected toward the center of the tube far enough to pivot the other end into engagement with the tube and stop further movement of the first link mechanism. A second link mechanism is moved toward the outer end of the taper until it engages the taper adjacent its outer end. The distance between a reference joint on the first mechanism and a reference joint on the second is approximately the length of the taper.

6 Claims, 4 Drawing Sheets

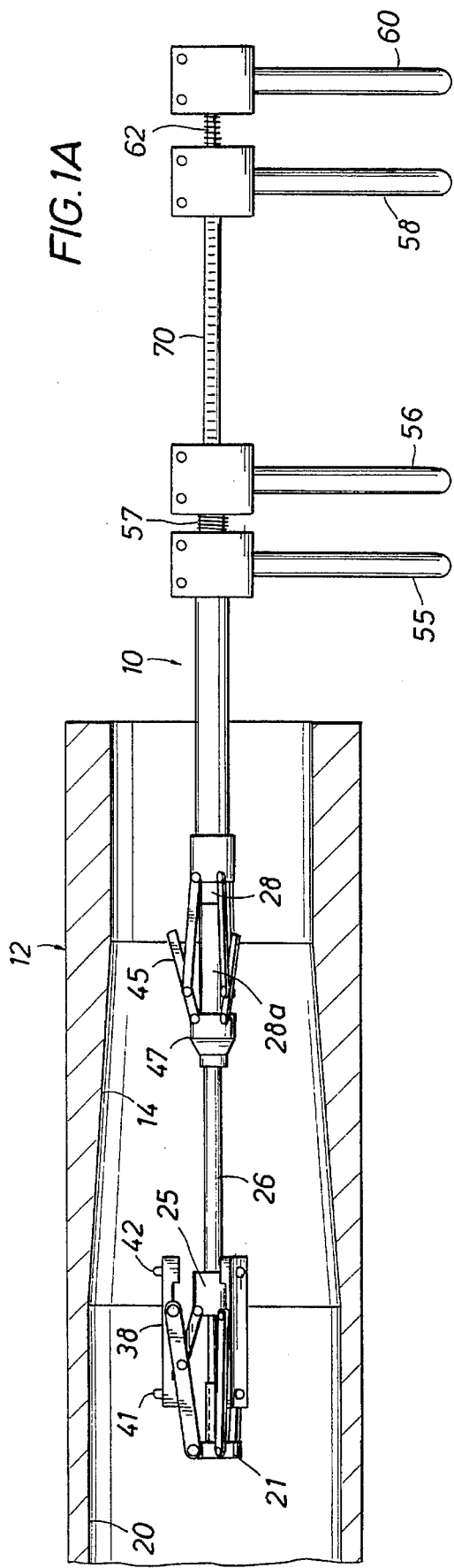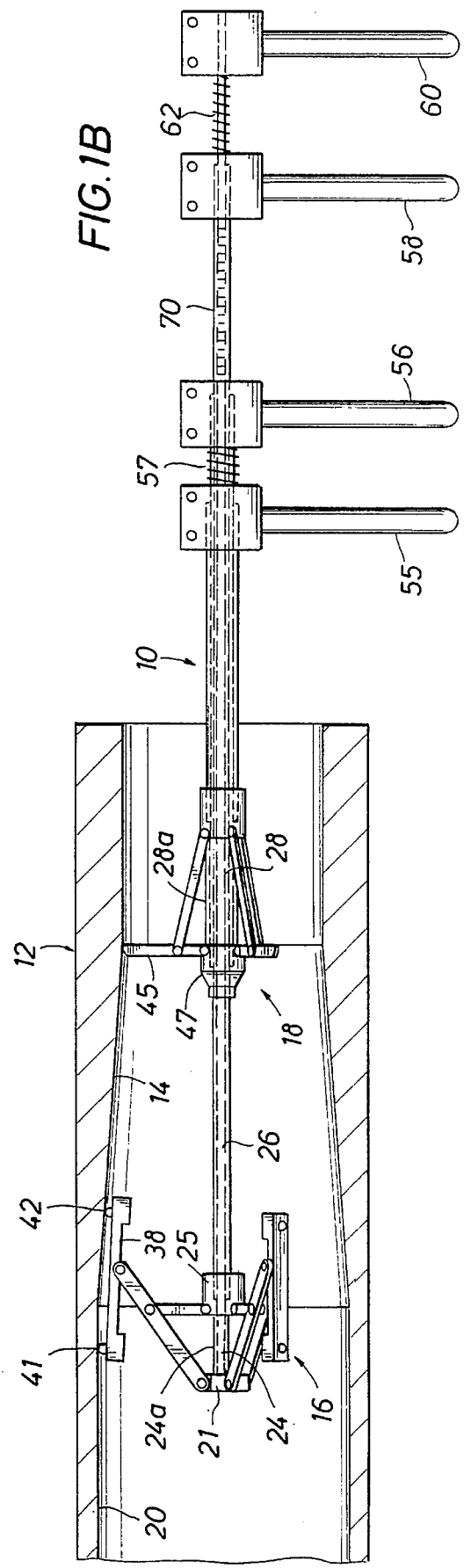

FIG.5
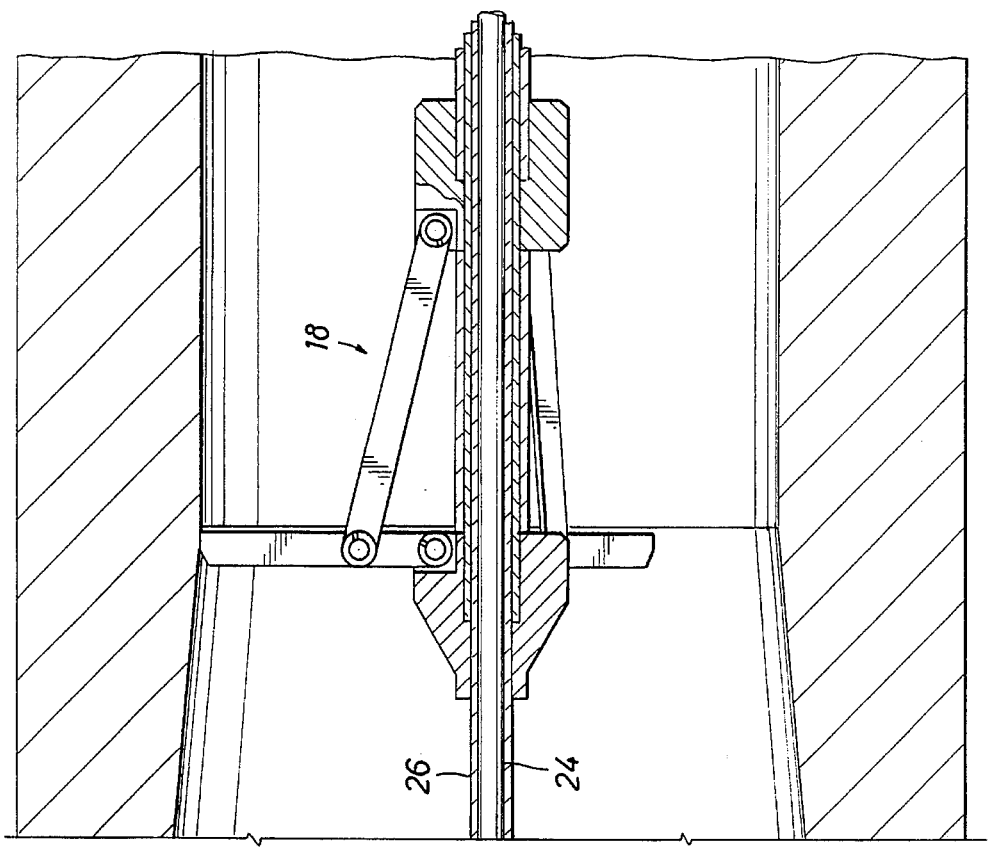
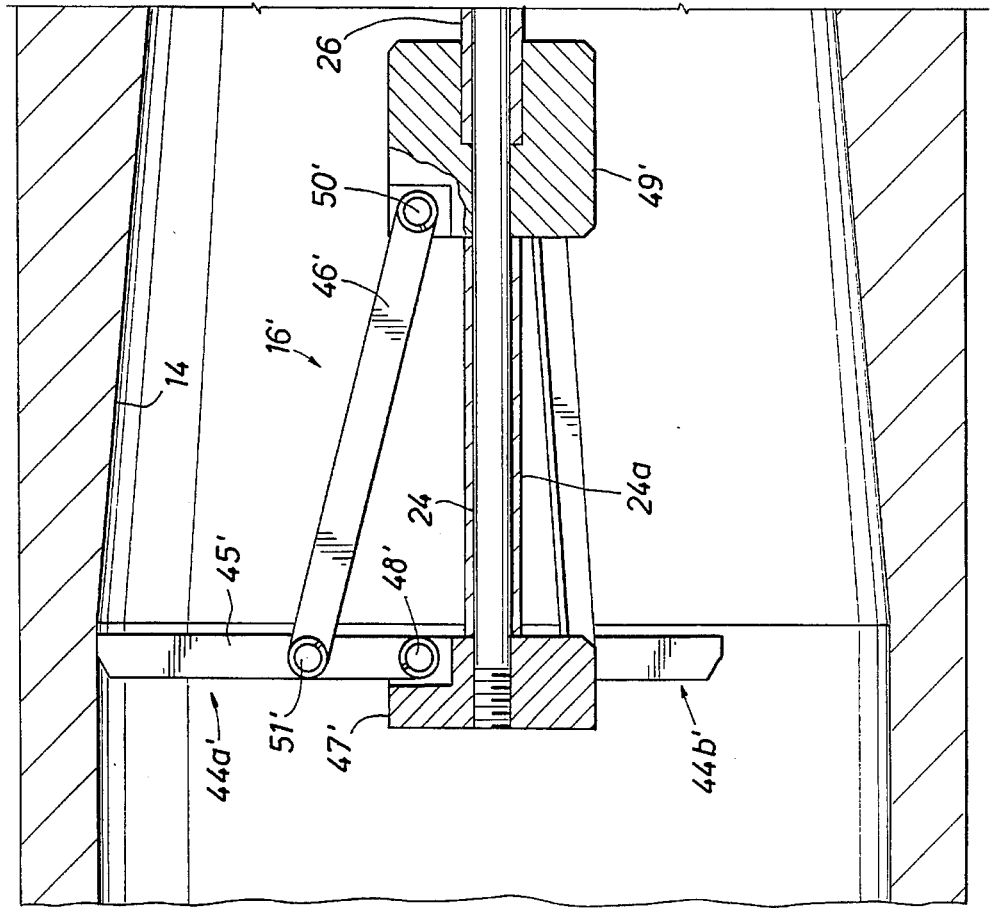

METHOD AND APPARATUS FOR MEASURING THE LENGTH (MIU) OF THE INTERNAL TAPER OF AN INTERNALLY UPSET DRILL PIPE TUBE

This invention relates to a method of and apparatus for measuring the projected length (Miu) of the internally tapered section of an internally upset drill pipe tube along the longitudinal axis of the tube.

The end portions of a drill pipe tube are upset to provide thicker walls for welding the tube to tool joints. The thicker walls reduce the stress in the upset below that in the tube. As a consequence, drill pipe failures nearly always occur in the tube at or near the inner end of the internal taper because of the relatively large change in the thickness of the pipe through a short transition zone, which causes high stress concentrations in the tube adjacent the inner end of the internal taper.

Consequently, there has been an effort to lengthen the internal taper of internally upset drill pipe tubes that extend between the thick wall cylindrical section and the nominal tube wall and to increase the radius of curvature between the internal taper and the tube.

In the marketing of drill pipe today, the length of the (Miu) of the pipe is critical. The manufacture who can supply pipe with the longest (Miu) usually gets the sale. Many purchasers of drill pipe are requiring manufactures to guarantee a minimum length and all joints having less than the minimum (Miu) are rejected.

The problem is how to accurately and easily measure the length of the internal taper short of cutting a section out of the pipe. Presently there are two non-destructive ways of measuring the (Miu) of an internally upset drill pipe tube. One is basically a pantograph having one pointer that moves longitudinally along the internal taper while a second pointer traces on paper the profile of the taper in response to the movement of the first. The accuracy of this device varies with the skill of the operator and it is very time-consuming.

Ultrasonic sound waves are also used to measure the wall thickness along the upset portion of the tube to determine the length of the internal taper. This is an expensive operation and it is also a time-consuming procedure.

Therefore, it is an object of this invention to provide a method of and apparatus for measuring quickly and with acceptable accuracy the length along the longitudinal axis of the tube (Miu) of the internal tapered section of an internally upset drill pipe tube.

It is a further object and feature of the invention to provide a method of measuring the length (Miu) of the internal taper of an internally upset drill pipe tube comprising the steps of positioning a first link machine having a plurality of link mechanisms in the tube opposite the inner end of the taper, moving a plurality of locating arms carried by the link mechanisms outwardly to a position adjacent the inner wall of the tube with their longitudinal axes parallel to the longitudinal axis of the tube, moving the link mechanisms toward the open end of the tube until longitudinally spaced contact points on the locating arms engage the taper and the inner wall of the tube to prevent further movement of the link mechanism toward the open end and to locate a selected member of the link mechanism about in alignment with the innermost end of the taper, expanding a second link mechanism to move a plurality of measuring links of predetermined length to positions with their longitudinal axes perpendicular to the longitudinal axis of the tube, moving the second link mechanism toward the end of the taper until the ends of the measuring links engage the taper adjacent its outer end, and measuring the distance between the selected member of the first link mechanism and measuring links of the second link mechanisms to determine the length of the internal taper.

It is a further object of this invention to provide the method of this invention with the further initial step of calibrating the apparatus to measure the internal taper of a plurality of drill pipe tubes of the same nominal diameter and made of the same metal that was upset sequentially to provide a plurality of joints of drill pipe to form a string of drill pipe comprising the steps of locating the inner end of the taper using ultrasonic sound waves or the pantograph described above and adjusting the contact points on the locating arms to indicate the measured length of the taper.

It is a further object of this invention to provide the method of this invention with the further initial step of calibrating the apparatus to measure the internal taper of a plurality of drill pipe tubes of the same nominal diameter and made of the same metal that was upset sequentially to provide a plurality of joints of drill pipe to form a string of drill pipe comprising the steps of cutting a window through the wall of one of the drill pipe tubes parallel to the longitudinal axis of the tube to expose the taper, positioning the first and second link mechanisms in the tube and adjusting the height of the contact points on the link arms of the first mechanism to position one of the links in each of the link mechanisms with its longitudinal axis perpendicular to the inner wall of the tube and in the plane of the inner end of the taper when the contact points are in engagement with the taper and the inner wall of the tube stopping further outward movement of the link mechanism.

It is a further object and feature of this invention to provide apparatus for measuring the length of the internal taper (Miu) of an internally upset drill pipe tube including a first set of link mechanisms including locating arms extending generally parallel to the longitudinal axis of the tube, spaced, adjustable contact points mounted on the locating arms, a control rod assembly for moving the locating arms along the longitudinal axis of the tube and for expanding the link mechanisms to move the contact points to a position adjacent the inner wall of the tube so that as the locating arms are moved into the taper one contact point will move down the taper and pivot the other contact point into engagement with the inner wall and stop further movement of the locating arms when selected links of the link mechanisms are about in alignment with the inner end of the taper, a second set of link mechanisms including fingers, a second control rod assembly for moving the link mechanisms along the longitudinal axis of the tube and for expanding the link mechanisms to position one end of each finger to move into engagement with the internal taper adjacent its end as the second link mechanism is moved outwardly to stop the movement of the link mechanism, and measuring the distance between the selected links of the first link mechanism and the fingers of the second link mechanism to determine the (Miu) of the taper.

These and other objects, advantages, and features of this invention will be apparent to those skilled in the art from a consideration of this specification including the attached drawings and appended claims.

In the Drawings:

FIG. 1A is a side view of the preferred embodiment of a tool for practicing the method of this invention for measuring the internally tapered section of a drill pipe tube showing the tool in its retracted position inside of an internally upset drill pipe tube.

FIG. 1B is a side view of the tool of FIG. 1A in its expanded position.

FIG. 5 is a view on an enlarged scale, partly in section and partly in elevation, of an alternative embodiment of the tool.

The apparatus, generally indicated by the number 10 for performing the method of this invention, includes first and second link machines 16 and 18, respectively.

Figure 2:
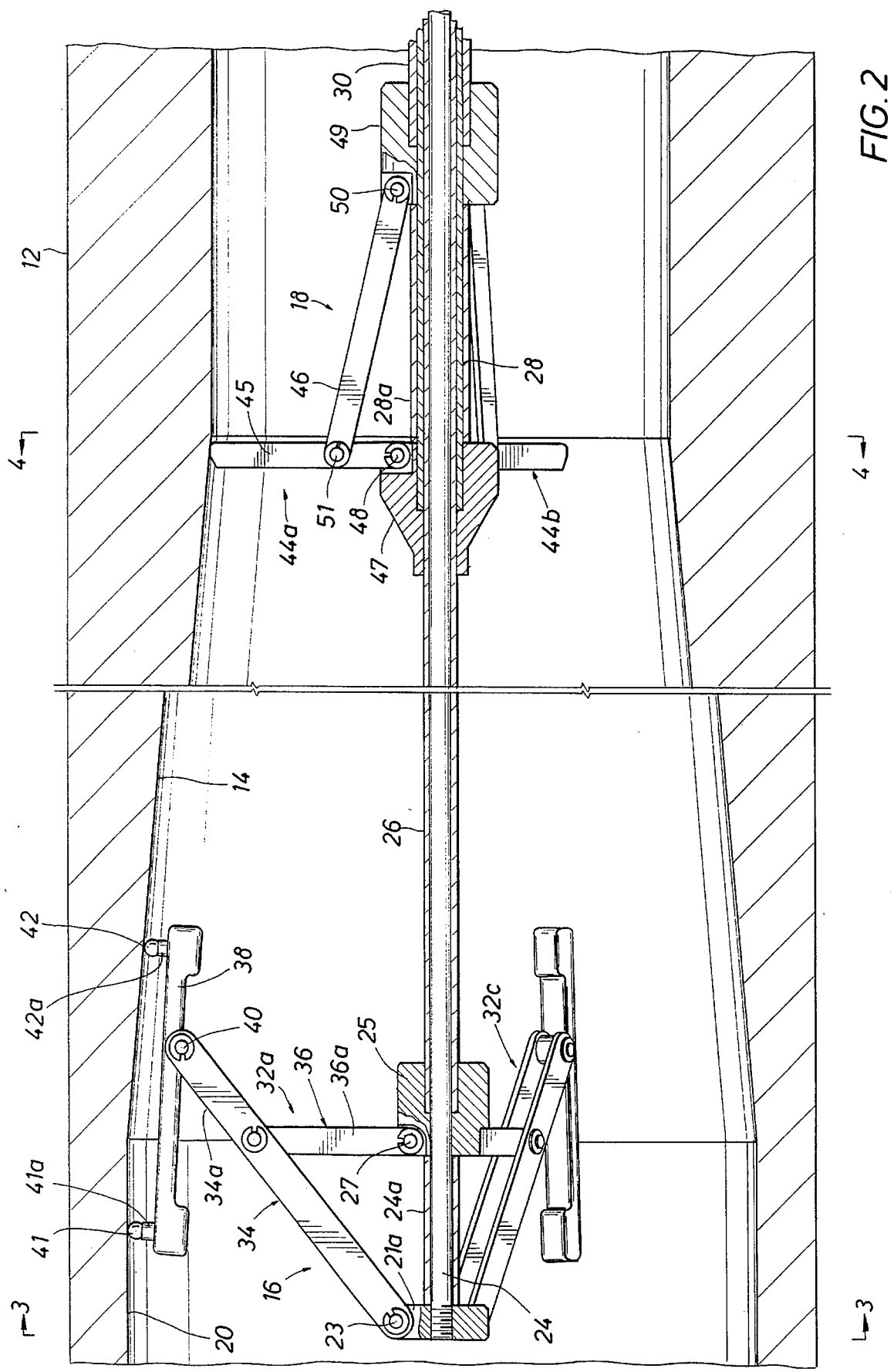
FIG. 2 is a view on an enlarged scale, partly in section and partly in elevation, of the tool shown in FIGS. 1A and 1B in position to indicate the length of the internal taper of the upset.

As shown in FIG. 2, first and second link machines 16 and 18 are connected to a system of telescoping control rods the outer three of which are, of course, hollow. The first link machine is connected to innermost rods 24 and 26. The second link machine is connected to outermost rods and 30. Relative movement between the control rods expands and contracts the two link machines.

The first link machine comprises three first link mechanisms 32a, 32b, and 32c. All three link mechanisms are structurally the same, so only mechanism 32a will be described in detail. It includes two link assemblies 34 and 36. Link assembly 34 includes two spaced identical links 34a and 34b that are connected to lobe 21a of head 21 on innermost control rod 24 by pin 23. Link assembly 36 comprises two spaced identical links 36a and 36b that are connected at one end to head 25 on innermost control rod 26 by pin 27 and to link 34 between its ends by pin 29.

Locating arm 38 is positioned between the ends of links 34a and 34b and supported for rotation in the plane of the longitudinal axis of the pipe by pin 40. The links are designed so that the locating arms will be close to the inside surface of the tube when head 25 is moved toward head 21 by control rod 26 until head 25 engages stop sleeve 24a on rod 24. This movement also moves link assembly 36 to a vertical position. Each locating arm is provided with spaced balls 41 and 42 to provide longitudinally spaced contact points between the locating arm and the tube. The distance from pivot pin 40 and ball 41 is about twice the distance to ball 42. The balls are attached to threaded shafts 41a and 42a that engage tapped holes in the locating arm to allow the height of the balls above the link arm to be adjusted.

Figure 3:
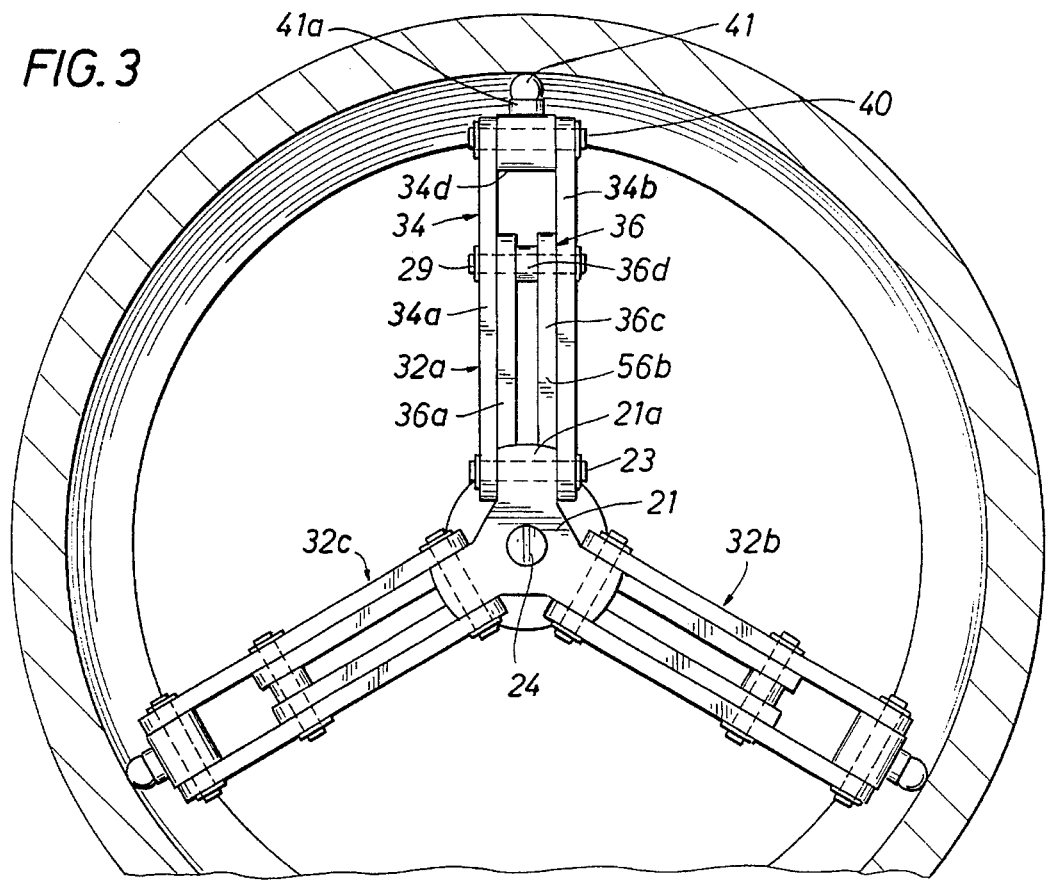
FIG. 3 is a sectional view taken along line 3—3 of FIG. 2.
Figure 4:
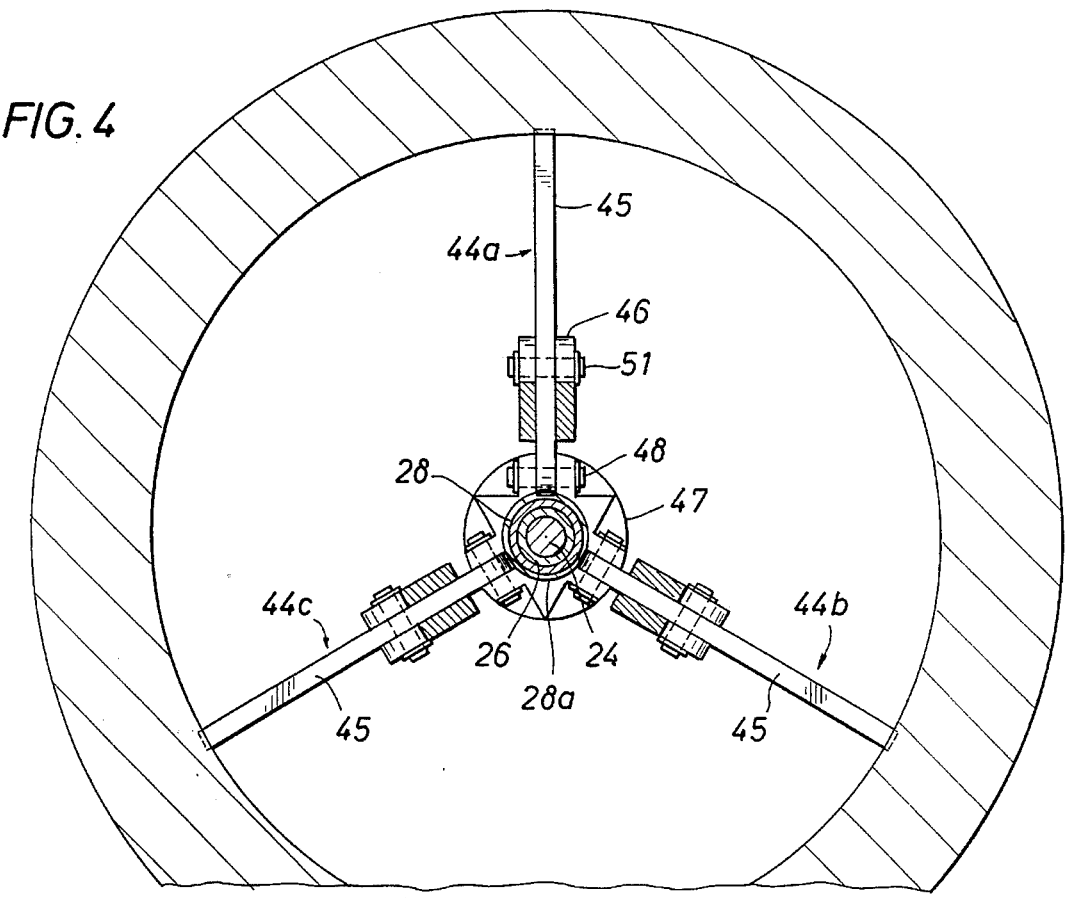
FIG. 4 is a sectional view taken along line 4—4 of FIG. 2.

Second link machine 18 includes at least one link mechanism and preferably three link mechanisms 44a, 44b, and 44c. All three link mechanisms are structurally the same so only mechanism 44a will be described in detail. It includes two links 45 and 46. Link 45 is connected to head 47 on next outermost rod 28 by pin 48. Link 46 is connected at one end to head 49 on outermost rod 30 by pin 50 and at the other end to link 45 between its ends by pin 51. Telescoping movement of control rods 28 and 30 moves heads 47 and 49 toward each other until the heads engage opposite ends of stop tube 28a positioned on tube 28. This movement causes links 46 to pivot links 45 into a position perpendicular to the longitudinal axis of the tube. Link 45 must be long enough to engage tapered section 14 adjacent its outer end as rods 28 and 30 are pulled toward the end of the tube with the link positioned as shown in FIG. 2. The engagement of link 45 with the tapered section adjacent its outer end, as shown in FIG. 1B and FIG. 3, will stop the movement of the second link machine toward the open end of the tube.

To operate the apparatus to practice the method of this invention handles 55 and 56 are attached to outermost control rods 30 and 28, respectively, and handles 58 and 60 are attached to innermost control rods 26 and 24, respectively, as shown in FIGS. 1A and 1B. Coil springs 57 and 62 are positioned to urge the handles attached to rods 28 and 30 and the handles attached to rods 24 and 28 apart to expand the first and second link machines. Therefore, in operation, handles 58 and 60 are moved together to compress spring 62 and collapse the first link machine so it can be inserted into the tube to a position beyond tapered section 14. The second link machine will collapse sufficiently to be moved into position in the tapered section by the engagement of links 45 with the inner wall of the tube or it can be collapsed, as shown in FIG. 1A by moving handles 55 and 56 together against spring 57.

In the manufacture of a string of drill pipe, the drill pipe tubes will have approximately the same diameter and wall thickness and the tubes will be made of the same steel. Further, if each of the tubes are upset the same way, they should all have internal tapers of about the same length. Therefore, the tool of this invention is calibrated for each string before it is used to measure the tapers of each joint of pipe. This is done by cutting about a 60° window in the upset end of one of the tubes to expose the taper. The measuring tool is then positioned in the tube with the link machines expanded. The contact balls on the link arms are adjusted so that when the link arms have entered the tapered section to the position shown in FIG 1B and FIG. 2, one contact ball will be in engagement with the taper, and the other will be in engagement with the inner wall of the tube, and link 36 will be aligned with the inner end of the taper. So positioned the link machine is held against further outward movement. Once so calibrated, the tool can be used to measure the tapers of the string as follows.

The link machines are positioned in each tube with the first link machine beyond the taper. The link machines are expanded and the machines are moved toward the open end of the tube until they stop. Scale 70 on control rod 28 indicates the length of the taper along the longitudinal axis of the tube (the Miu) which is the distance between links 36 and links 45. The first and second link machines are then collapsed by moving the handles together against springs 57 and 62 and the tool is removed from the tube.

FIG. 5 displays an alternative embodiment of apparatus 10 wherein first link machine 16' is similar in structure to second link machine 18. Thus, first link machine 16' includes at least one link mechanism and preferably three link mechanisms 44a', 44b', and 44c'. Again, all three link mechanisms are structurally similar so only mechanism 44a' will be described in detail. It includes two links 45' and 46'. Link 45', also known as a finger, is connected to head 47' on the innermost rod 24 by pin 48'. Link 46' is connected at one end to head 49' on rod 26 by pin 50' and at the other end to link 45' between its ends by pin 51'. Telescoping movement of control rods 24 and 26 moves heads 47' and 49' toward each other until the heads engage opposite ends of stop tube 24a positioned on rod 24. This movement causes links 46' to pivot links 45' into a position perpendicular to the longitudinal axis of the tube. Link 45' must be long enough to be positioned by this movement adjacent the inner surface of the tube beyond tapered section 14 so as to engage tapered section 14 adjacent its inner end as rods 24 and 26 are pulled toward the end of the tube with the link positioned as shown in FIG. 5. The engagement of link 45' with the tapered section adjacent its inner end will stop movement of the first link machine toward the open end of the tube. It will be apparent to those skilled in the art that operation of this embodiment will follow in accordance with the manner described above for the other embodiment.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. In an internally upset drill pipe tube having an internal taper (Miu), a method of measuring the length of the internal taper, comprising the steps of positioning a first link machine having a plurality of link mechanisms in the tube beyond the inner end of the taper, expanding the first link machine to move a plurality of locating arms carried by the link mechanisms outwardly to a position adjacent the inner wall of the tube with their longitudinal axes parallel to the longitudinal axis of the tube, moving the first link machine towards the outer end of the tube until a contact point on each locating arm engages the taper and another contact point on each locating arm engages the inner wall of the tube beyond the taper, positioning a second link machine having a plurality of link arms in the tube within the taper, expanding the second link machine to move the plurality of link arms outwardly to a position whereby the ends of the link arms radially approximate the internal diameter of the taper adjacent the outer end of the taper, moving the second link machine toward the outer end of the tube until the ends of the link arms engage the outer end of the taper, and measuring the distance between the engaged positions of the first and second link machines to determine the length of the internal taper.

2. The method of claim 1 further including the first steps of calibrating the first link machine to measure the internal taper of a plurality of drill pipe tubes of the same nominal diameter comprising the steps of positioning the first link machine in the tube at the inner end of the taper, expanding the first link machine until the contact points of the locating arms respectively engage the taper and the inner wall of the tube beyond the taper whereby movement of the first link machine into the tapered section of the pipe is prevented, and setting an expansion limit for the first link machine while expanded.

3. The method of claim 2 wherein the position of the inner end of the taper is located by cutting a window through the wall of one of the drill pipe tubes parallel to the longitudinal axis of the tube to expose the taper.

4. The method of claim 2 wherein the expansion limit is set by adjusting the height of the contact points on the locating arms such that movement of the first link machine into the tapered section is prevented.

5. For use in an internally upset drill pipe tube having an internal taper (Miu), an apparatus for measuring the length of the internal taper including a first set of link mechanisms including locating arms extending generally parallel to the longitudinal axis of the tube, and spaced, adjustable contact points mounted on the locating arms, a control rod assembly for moving the locating arms along the longitudinal axis of the tube and for expanding the first set of link mechanisms to move the contact points to a position adjacent the inner wall of the tube so that as the locating arms are moved into the taper one contact point will move down the taper and pivot the other contact point into engagement with the inner wall and stop further movement of the locating arms when selected links of the link mechanisms are about in alignment with the inner end of the taper, a second set of link mechanisms including fingers, a second control rod assembly for moving the second set of link mechanisms along the longitudinal axis of the tube and for expanding the second set of link mechanisms to position one end of each finger to move into engagement with the internal taper adjacent its outer end as the second link mechanism is moved outwardly to stop the movement of the link mechanism, and means for measuring the distance between the selected links of the first set of link mechanisms and the fingers of the second set of link mechanisms to determine the length of the internal taper (Miu).

6. For use in an internally upset drill pipe tube having an internal taper (Miu), an apparatus for measuring the length of the internal taper including a first set of fingers, means for expanding the first set of fingers into a position adjacent the inner wall of the tube beyond the tapered portion, means for moving the first set of fingers until the fingers engage the tapered section, a second set of fingers, means for expanding the second set of fingers to a diameter slightly greater than the smallest diameter of the tapered section, means for moving the second set of fingers into engagement with the internal taper adjacent its outer end, and means for measuring the distance between the first and second sets of fingers.

* * * * *